United States Patent [19]

Seitz et al.

[11] Patent Number: 5,342,898
[45] Date of Patent: * Aug. 30, 1994

[54] PARTICULATE GRAFT POLYMER, AND THERMOPLASTIC MOLDING MATERIAL PRODUCED THEREFROM HAVING IMPROVED TOUGHNESS

[75] Inventors: Friedrich Seitz, Friedelsheim; Karl Ruppmich, Ludwigshafen; Norbert Guentherberg, Mainz; Norbert Niessner, Friedelsheim, all of Fed. Rep. of Germany

[73] Assignee: BASF Aktiengesellschaft, Ludwigshafen, Fed. Rep. of Germany

[ * ] Notice: The portion of the term of this patent subsequent to Jun. 9, 2009 has been disclaimed.

[21] Appl. No.: 82,165

[22] Filed: Jun. 28, 1993

Related U.S. Application Data

[63] Continuation of Ser. No. 681,065, Apr. 5, 1991, abandoned.

[30] Foreign Application Priority Data

Apr. 6, 1990 [DE] Fed. Rep. of Germany ....... 4011163

[51] Int. Cl.$^5$ .................. C08F 265/02; C08F 265/04; C08F 271/02; C08F 279/02
[52] U.S. Cl. ....................... 525/281; 525/70; 525/73; 525/77; 525/78; 525/80; 525/83; 525/85; 525/86; 525/289; 525/293; 525/301; 525/309; 525/310
[58] Field of Search ....................... 525/73, 80, 85, 86, 525/279, 281, 289, 293, 301, 308, 309, 310, 316, 70

[56] References Cited

U.S. PATENT DOCUMENTS

| | | | |
|---|---|---|---|
| 3,055,859 | 9/1962 | Vollmert | 260/45.5 |
| 4,393,164 | 7/1983 | McKee et al. | 525/84 |
| 4,634,734 | 1/1987 | Hambrecht et al. | 525/85 |
| 4,764,563 | 8/1988 | Meredith et al. | 525/316 |
| 4,788,253 | 11/1988 | Hambrecht et al. | 525/85 |
| 4,912,162 | 3/1990 | Kishida et al. | 525/67 |
| 5,120,788 | 6/1992 | Seitz et al. | 525/85 |

FOREIGN PATENT DOCUMENTS

| | | |
|---|---|---|
| 0231933 | 8/1987 | European Pat. Off. . |
| 1260135 | 11/1968 | Fed. Rep. of Germany . |
| 1124911 | 8/1968 | United Kingdom . |

*Primary Examiner*—Vasu S. Jagannathan
*Attorney, Agent, or Firm*—Oblon, Spivak, McClelland, Maier & Neustadt

[57] ABSTRACT

A particulate graft polymer comprising

A: from 30 to 80% by weight of one or more elastomeric polymers A having a mean particle size of from 30 to 1000 nm, comprising, based on A, A1: from 85 to 99.8% by weight of one or more alkyl acrylates A1 having from 1 to 8 carbon atoms in the alkyl radical, A2: from 0.1 to 5% by weight of one or more polyfunctional, crosslinking monomers A2, and A3: from 0.1 to 10% by weight of one or more monomers A3 containing one or more acid groups, or A11: up to 100% by weight of a diene A11, A12: up to 50% by weight of one or more vinylaromatic monomers A12, A13: up to 10% by weight of one or more monomers A13 containing one or more acid groups, as the graft base, and B: from 20 to 70% by weight of a shell B grafted onto the elastomeric polymer A and comprising, based on B, B1: from 50 to 89.9% by weight of one or more vinylaromatic monomers B1, B2: from 10 to 49.9% by weight of one or more polar, copolymerizable, ethylenically unsaturated monomers B2, and B3: from 0.1 to 10% by weight of one or more monomers B3 containing one or more basic groups.

8 Claims, No Drawings

PARTICULATE GRAFT POLYMER, AND THERMOPLASTIC MOLDING MATERIAL PRODUCED THEREFROM HAVING IMPROVED TOUGHNESS

This application is Continuation of application Ser. No. 07/681,065, filed on Apr. 5, 1991, now abandoned.

The present invention relates to particulate graft polymers which are suitable as the soft component for thermoplastic molding materials.

The preparation of particulate graft polymers comprising a rubber-elastic core, i.e. a polymer having a glass transition temperature of below 0° C., and a graft shell is known, for example by emulsion polymerization. To this end, a graft base is first prepared by emulsion polymerization of suitable monomers. The monomers which are to form the graft shell are then polymerized in the presence of the graft base in such a manner that a very high proportion is grafted onto the graft base. The particulate graft polymers are used to improve the impact strength of thermoplastics, which are, per se, brittle and impact-sensitive. The monomers for the graft shell are selected to be compatible with the thermoplastic to be modified. The preparation of such impact modifiers has long been known and is described, for example, in U.S. Pat. No. 3,055,859 and German Patent 12 60 135.

A major problem in the preparation of such particulate graft polymers is the binding of the graft shell to the graft base. If the binding is poor, the impact-modifying effect is inadequate, giving only products of reduced toughness. In order to improve the binding, a number of measures have been proposed, of which we will mention only the use of graft-linking or graft-enhancing monomers in the preparation of the graft base (e.g. U.S. Pat. No. 4,764,563 and EP-A-231 933).

According to a definition given in EP-A-231 933, graft-linking monomers differ from crosslinking monomers in that the former contain two or more polymerizable double bonds which differ significantly in reactivity with respect to polymerization, while the double bonds of crosslinking monomers have approximately the sic reactivity. However, it is known that it is generally not possible to make such a sharp differentiation, since even the less reactive double bonds of the graft-linking monomers have sometimes already reacted during preparation of the graft base, resulting in increased crosslinking of the latter. They are thus no longer available for grafting reactions. On the other hand, the proportion of graft-linking monomers in the graft base cannot be increased at will, since their crosslinking action results in embrittlement of the elastomeric polymer used as the graft base.

In principle, it is known (cf. DE-A 34 21 353) to use both acidic and simultaneously basic monomers in the graft shell of a rubber component; the aim of this is to produce polymers having a matt surface. There has hitherto been no mention of the use of an acidic monomer in the rubber and simultaneously of a base in the graft shell significantly improving the notched impact strength.

We have found that the binding of the graft shell (B) to the graft base (A) can be considerably improved if the graft base (A) is a polymer which contains either from 85 to 99.8% by weight of an alkyl acrylate (A1) having from 1 to 8 carbon atoms in the alkyl, from 0.1 to 5% by weight of a polyfunctional, crosslinking monomer (A2) and from 0.1 to 10% by weight of an acidic group-containing monomer (A3) or at least 50% by weight of a diene (A11) and up to 50% by weight of at least one further ethylenically unsaturated monomer (A12) and up to 0% by weight of an acidic group-containing monomer (A13) in copolymerized form, onto which is grafted, as the graft shell (B), a monomer mixture comprising from 50 to 89.9% by weight of a vinyl-aromatic monomer (B1), from 10 to 49.9% by weight of a polar, copolymerizable, ethylenically unsaturated monomer (B2) and from 0.1 to 0% by weight of a base-containing monomer (B3).

The graft polymers according to the invention preferably comprise from 55 to 70% by weight of A and from 30 to 45% by weight of B; the proportions of the individual constituents, in each case based on A or B, should preferably be A1: from 92 to 99.6% by weight
A2: from 0.2 to 4% by weight
A3: from 0.2 to 5% by weight
A11: from 80 to 99.8% by weight
A12: from 0 to 20% by weight
A13: from 0.2 to 5% by weight
B1: from 65 to 84.8% by weight
B2: from 15 to 30% by weight
B3: from 0.2 to 5% by weight.

For the sake of completeness, it should be added that, for these data, the monomers B1 to B3, which are not linked to the graft core by grafting, but instead are merely incorporated as occluded polymers, are included in the graft shell. B1 to B3 thus give the amounts added during the preparation.

The present invention accordingly provides particulate graft polymers of the abovementioned, preparation-determined composition, and thermoplastic molding materials prepared using such graft polymers. The following details apply to the particulate graft polymers, their constituents, their preparation and the preparation of corresponding molding materials:

The particulate graft polymers are obtained from a graft base (rubber) A and a graft shell B in a conventional manner. The rubber A is either a crosslinked acrylate polymer or a diene copolymer having a glass transition temperature of below 0° C., preferably below −20° C., particularly preferably below −30° C. (the glass transition temperature is determined, for example, by the DSC method; K. H. Illers, Makromol. Chemie 127 (1969), p. 1).

Suitable monomers A1 are acrylates having from 1 to 8 carbon atoms, at least in part those having from 4 to 8 carbon atoms, in the alkyl radical. Particularly suitable acrylates are n-butyl acrylate and ethylhexyl acrylate. The acrylates may be employed individually or mixed with one another.

In order to achieve good mechanical properties, it has proven necessary for the acrylate polymer used as the graft base to be crosslinked. To this end, the polymerization of the acrylate is carried out in the presence of from 0.1 to 5% by weight, preferably from 0.2 to 4% by weight, based on the total weight of the monomers employed in the preparation of the graft base, of a copolymerizable, polyfunctional, crosslinking monomer A2. Suitable monomers are those which contain two or more copolymerization-capable ethylenic double bonds which are not conjugated in the 1,3-position. Examples are divinylbenzene, diallyl maleate, diallyl fumarate, diallyl phthalate, allyl methacrylate, triallyl cyanurate and triallyl isocyanurate. A particularly favorable crosslinking monomer is the acrylate of tricyclodecenyl alcohol (cf. German Patent 12 60 135).

In order to improve the binding of the graft shell to the graft base, the monomer mixture used for the preparation of the graft base additionally contains up to, or from 0.1 to, 10% by weight, preferably from 0.2 to 5% by weight, of one or more monomers which contain one or more acid groups (A3) or (A13) respectively. Particularly suitable acid groups are carboxylic acid and sulfonic acid groups. Preferred acidic monomers A3 (A13) are alpha,beta-unsaturated carboxylic acids, such as acrylic acid and methacrylic acid, furthermore citraconic acid, crotonic acid, fumaric acid, iraconic acid, maleic acid, vinylsulfonic acid, vinylbenzenesulfonic acid or cinnamic acid.

Suitable monomers A11 are butadiene, isoprene and derivatives thereof and, if appropriate, a styrene monomer A12 and, also if required, one of the abovementioned comonomers A3 (or A13) containing an acidic group.

The graft copolymer can be prepared by the method described in German Patent 12 60 135. To this end, the graft base A is first prepared, if it is intended to be an acrylate rubber, by polymerizing the acrylate A1, the polyfunctional monomer A2 and the acidic monomer A3 according to the invention in aqueous emulsion at from 20 to 100° C., preferably from 50° to 80° C. Conventional emulsifiers, such as the alkali metal salts of alkyl- or alkylarylsulfonic acids, alkyl sulfates, fatty alcohol sulfonates, salts of higher fatty acids having from 10 to 30 carbon atoms, or resin soaps, can be used. Preference is given to the sodium salts of alkyl sulfonates or of fatty acids having from 10 to 18 carbon atoms. It is favorable to employ the emulsifiers in an amount of from 0.5 to 5% by weight, in particular from 1 to 2% by weight, based on the total weight of the monomers used for the preparation of the graft base. In general, a water/monomer ratio of from 2:1 to 0.7:1 is used. The polymerization initiator used is, in particular, a conventional persulfate, e.g. potassium peroxodisulfate; however, redox systems are also suitable. The amount of initiator (e.g. from 0.1 to 1% by weight, based on the total weight of the monomers) depends, in a conventional manner, on the molecular weight desired.

The polymerization assistants used can be conventional buffers for a pH of, preferably, from 6 to 9, e.g. sodium bicarbonate and sodium pyrophosphate, and up to 3% by weight of a molecular weight regulator, such as a mercaptan, terpinol, or dimeric alpha-methylstyrene.

The precise polymerization conditions, in particular the nature, metering rate and amount of the emulsifier, are determined within the abovementioned ranges in such a manner that the resultant latex of the crosslinked acrylate polymer has a $d_{50}$ value in the range from about 30 to 1000 nm, preferably in the range from 50 to 800 nm.

If the graft core is to be a diene rubber, the procedure is expediently as follows:

The elastomer, the graft base A, is prepared by polymerizing A11 alone, or together with the further comonomers in aqueous emulsion in a conventional manner at from 20° to 100° C., preferably at from 50° to 80° C. Conventional emulsifiers, such as alkali metal salts of alkyl- or alkylarylsulfonic acids, alkyl sulfates, fatty alcohol sulfonates, salts of higher fatty acids having from 10 to 30 carbon atoms or resin soaps, may be used.

Preference is given to the sodium salts of alkylsulfonates or of fatty acids having from 10 to 18 carbon atoms. It is favorable to employ the emulsifiers in amounts of from 0.5 to 5% by weight, in particular from 0.5 to 2% by weight, based on the monomers employed in the preparation of the graft base A. In general, a water:monomer ratio of from 2:1 to 0.7:1 is used. The polymerization initiators used are, in particular, conventional persulfates, such as potassium persulfate, but it is also possible to use redox systems. The initiators are generally employed in amounts of from 0.1 to 1% by weight, based on the monomers employed in the preparation of the graft base A. As further polymerization aids, conventional buffers which establish a pH of, preferably, from 6 to 9, for example sodium bicarbonate and sodium pyrophosphate dienes, can be used; furthermore, from 0.1 to 3% by weight of a molecular weight regulator, such as a mercaptan, terpinol or dimeric α-methylstyrene, are generally used in the polymerization.

The precise polymerization conditions, in particular the type, metering rate and amount of the emulsifier, are selected individually within the abovementioned ranges in such a manner that the resultant latex of the polymer A has a $d_{50}$ value in the range of from about 100 to 750 nm, preferably in the range from 100 to 600 nm. Alternatively, however, the emulsion polymer having a mean particle size in the range from 60 to 150 nm is agglomerated in a known manner (cf. German Published Application DE-AS 24 27 960).

Graft shell B:

To prepare the graft copolymer comprising core and shell, a monomer mixture comprising from 50 to 89.9 % by weight of one or more vinyl-aromatic monomers B1, from 10 to 49.9% by weight of one or more polar, copolymerizable monomers B2 and from 0.1 to 10% by weight of one or more basic monomers B3 is polymerized in the presence of latex A. Examples of vinyl-aromatic monomers are styrene, alpha-methylstyrene and ring-alkylated styrenes, such as p-methylstyrene and tert-butylstyrene. Particular preference is given to styrene, alpha-methylstyrene and p-methylstyrene. Examples of polar, copolymerizable, ethylenically unsaturated monomers B2 are acrylonitrile, methacrylonitrile, alkyl acrylates and alkyl methacrylates having from 1 to 4 carbon atoms in the alkyl radical. Preference is given to acrylonitrile, methyl methacrylate and mixtures thereof. Suitable basic monomers B3 are monomers which can be copolymerized with B1 and B2 and contain one or more basic groups in the molecule. Preferred monomers B3 contain a tertiary amino group in the molecule. Specific examples are dimethylaminoethyl (meth)acrylate, morpholine methacrylate, N-vinylimidazole, p-dimethylaminostyrene, N-vinylcarbazole, N-vinylindole, N-vinylpyrrole, 4-vinylpyrimidine, 2-vinylpyridine, 3-vinylpyridine, 4-vinylpyridine and mixtures thereof. Particularly preferred monomers are esters of acrylic acid or methacrylic acid with aliphatic alcohols which contain a tertiary amino group in the alkyl radical. Specific examples are dimethylaminoethyl acrylate and methacrylate. Preferred monomer mixtures contain from 65 to 84.8 (70 to 79.5) % by weight of styrene and/or alpha-methylstyrene, from 15 to 40 (20 to 35) % by weight of acrylonitrile and from 0.2 to 5 (0.5 to 3) % by weight of the basic compound, preferably dimethylaminoethyl acrylate.

It is advantageous for the graft copolymerization onto the polymer serving as the graft base A to again be carried out in aqueous emulsion. It can be carried out in the same system as the polymerization of the graft base, possibly with addition of further emulsifier and initiator. These need not be identical to the emulsifier and initiator used for the preparation of the graft base A. Thus, it may be expedient, for example, to use a persulfate as the initiator for the preparation of the graft base A, but to employ a redox initiator system for the polymerization of the graft shell B. Otherwise, that stated above for the preparation of the graft base A also applies to the choice of emulsifier, initiator and polymerization assistants. The monomer mixture to be grafted on can be added to the reaction mixture in one portion, in several portions or preferably continuously during the polymerization. The graft copolymerization is controlled to give a degree of grafting of from 10 to 45% by weight, preferably from 15 to 40% by weight.

The particulate graft polymers according to the invention can be used as such as molding materials, with work-up, for example, by spray drying. However, they are preferably used for blending with a thermoplastic in order to increase its impact strength. Thermoplastics which are suitable for modification have glass transition temperatures of above 25° C., preferably above 60° C., particularly above 80° C., and are referred to as the hard component (matrix) below. Examples of suitable hard component are polyvinyl chloride, polymethyl methacrylate and, in particular, copolymers of a vinyl-aromatic monomer and a polar, copolymerizable, ethylenically unsaturated monomer. Suitable vinyl-aromatic monomers and polar, copolymerizable, ethylenically unsaturated monomers here are again those mentioned as B1 and B2 in the preparation of the graft shell. Particularly preferred hard components are styrene-acrylonitrile and alpha-methylstyrene-acrylonitrile copolymers. The particulate graft polymers according to the invention can be incorporated, for example, by isolating the particulate graft polymer from the emulsion by adding an electrolyte and subsequently mixing it, if desired after drying, with the hard component by joint extrusion, kneading or rolling.

The thermoplastic molding materials according to the invention may contain, as further constituents, additives which are conventional for thermoplastic molding materials. Specific examples are fillers, further, compatible plastics, antistatics, antioxidants, flameproofing agents, lubricants, dyes and pigments. The additives are employed in conventional amounts, preferably in amounts of up to 30% by weight, based on the total weight of the thermoplastic molding material. Compatible plastics may also make up a higher proportion.

The materials according to the invention can be converted by conventional thermoplastic-conversion processes, e.g. extrusion or injection molding, into a wide variety of moldings, e.g. window profiles, garden furniture, boats, signs, lamp covers, automobile parts and toys. The materials according to the invention are particularly suitable for the production of moldings in which high impact strength is required. The molding materials according to the invention have a considerably more matt surface compared with the prior art.

The parameters described in the present application were determined as follows:

1. The mean particle size stated is in all cases the weight average particle size, as determined by means of an analytical ultracentrifuge by the method of W. Scholtan and H. Lange, Kolloid-Z. and Z.-Polymere 250 (1972), pages 782 to 796. The ultracentrifuge measurement gives the integral weight distribution of the particle diameter of a sample. This can be used to determine the percentage by weight of the particles having a diameter less than or equal to a certain value. The mean particle diameter, which is also known as the $d_{50}$ value of the integral weight distribution, is defined as the value at which 50 % by weight of the particles have a smaller diameter and 50% by weight of the particles have a greater diameter.

2. The notched impact strength [in $kJ/m^2$] of a product was measured in accordance with DIN 53 453 on small standard injection-molded specimens at 23° C. Three series of samples were investigated in each case at three different injection temperatures. The results for the examples are shown in Table 1.

3. The viscosity numbers [in $cm^3/g$] were determined on a 0.5% strength solution in methyl ethyl ketone. Gel components were removed before the measurement by centrifugation and the sample weight corrected appropriately.

In the examples, parts and percentages are by weight, unless otherwise stated.

EXAMPLE 1

1. Preparation of the graft base A

Each acrylate-based graft base (A1, A2, A3) was prepared by the following general procedure:

160 g of the monomer mixture given in Table 1 for the preparation of the graft base A were warmed to 60° C. with stirring in 1500 g of water with addition of 5 g of the sodium salt of a $C_{12}$- to $C_{18}$-paraffinsulfonic acid, 3 g of potassium peroxodisulfate, 3 g of sodium bicarbonate and 1.5 g of sodium pyrophosphate. Ten minutes after the polymerization reaction had commenced, a further 840 g of the mixture given in Table 1 were added over the course of 3 hours. When the addition of monomer was complete, the emulsion was kept at 60° C. for a further hour.

2. Preparation of the particulate graft polymers 2100 g of the emulsion prepared by the above procedure (1) were mixed with 1150 g of water and 2.7 g of potassium peroxodisulfate, and the mixture was warmed to 65° C. with stirring. When the reaction temperature had been reached, 560 g of the monomer mixture given in Table 1 for the preparation of the graft shell B were metered in over the course of 3 hours. When the addition was complete, the emulsion was kept at 65° C. for a further 2 hours. The graft polymer was precipitated from the emulsion at 95° C. by means of calcium chloride solution, washed with water and dried in a stream of warm air.

For a diene-based graft base (A11, A12 and A13), the following procedure is used, for example:

600 g of butadiene are polymerized in the presence of a solution of 6 g of tert-dodecyl mercaptan, 6 g of methacrylic acid, 7 g of sodium $C_{14}$-alkylsulfonate as emulsifier, 2 g of potassium peroxodisulfate and 2 g of sodium pyrophosphate in 800 ml of water at 65° C. to give a polybutadiene latex. The conversion is 98 %.

A latex is obtained with a mean particle size of 0.1 μm.

The latex obtained is agglomerated by adding 25 g of an emulsion of a copolymer comprising 96 parts of ethyl acrylate and 4 parts of methacrylamide having a solids content of 10% by weight, giving a polybutadiene latex with a mean particle size of 0.35 μm.

400 g of water, 4 g of sodium C₁₄-alkylsulfonate and 2 g of potassium peroxodisulfate are added, followed, over the course of 4 hours, by 400 g of a mixture of styrene and acrylonitrile and the basic component B3 in the ratios given in Table 1. Polymerization is carried out at 75° C. while stirring the batch. The conversion, based on styrene-acrylonitrile, is virtually quantitative. The graft rubber dispersion obtained is precipitated using calcium chloride solution, and the graft copolymer is separated off, washed with distilled water and dried.

3. Blending with the hard component

The hard component used to produce the blends was a styrene-acrylonitrile copolymer containing 35% of acrylonitrile and having a viscosity number of 80 ml/g. The precipitated and dried graft copolymer from (2) was blended with the hard component in an extruder at 260° C. in such a manner that the resultant mixture contained 50% or 46% of graft polymer. Moldings were produced from this mixture by injection molding.

TABLE 1

| | Graft base A¹ | | | Graft shell B² | | | Injection temperature³ | Notched impact strength [kJ/m²] |
|---|---|---|---|---|---|---|---|---|
| | BA | DCPA | MAA | S | AN | DMAEA | | |
| 1 | 97 | 2 | 1 | 74 | 25 | 1 | 220° C. | 26 |
| | | | | | | | 250° C. | 27 |
| | | | | | | | 280° C. | 26 |
| 2 | 97 | 2 | 1 | 73 | 25 | 2 | 220° C. | 25 |
| | | | | | | | 250° C. | 25 |
| | | | | | | | 280° C. | 22 |
| 3 | 96 | 2 | 2 | 74 | 25 | 1 | 220° C. | 27 |
| | | | | | | | 250° C. | 26 |
| | | | | | | | 280° C. | 22 |
| 4 | 96 | 2 | 2 | 73 | 25 | 2 | 220° C. | 24 |
| | | | | | | | 250° C. | 22 |
| | | | | | | | 280° C. | 21 |
| 5 | 93 | 2 | 5 | 74 | 25 | 1 | 220° C. | 22 |
| | | | | | | | 250° C. | 22 |
| | | | | | | | 280° C. | 21 |
| C⁴ | 98 | 2 | — | 75 | 25 | — | 220° C. | 6 |
| | | | | | | | 250° C. | 9 |
| | | | | | | | 280° C. | 14 |

¹Composition of the monomer mixture used to prepare the graft base A
²Composition of the monomer mixture used to prepare the graft shell b
³Bulk temperature of the thermoplastic molding material during injection molding
⁴Comparative experiment corresponding to the prior art
BA = Butyl acrylate
DCPA = Acrylic acid ester of tricyclodecenyl alcohol
MAA = Methacrylic acid
S = Styrene
AN = Acrylonitrile
DMAEA = Dimethylaminoethyl acrylate

TABLE 2

| | Graft base A¹ | | Graft shell B² | | | Notched impact strength³ [kJ/m²] [23° C.] |
|---|---|---|---|---|---|---|
| | BU | MAA | S | AN | Base | |
| 1 | 100 | — | 70 | 30 | — | 18 |
| 2 | 99 | 1 | 69 | 30 | 1 DMAEA | 31 |
| 3 | 99 | 1 | 68 | 30 | 2 DMAEA | 28 |
| 4 | 98 | 2 | 69 | 30 | 1 DMAEA | 29 |
| 5 | 98 | 2 | 68 | 30 | 2 DMAEA | 30 |

TABLE 2-continued

| | Graft base A¹ | | Graft shell B² | | | Notched impact strength³ [kJ/m²] [23° C.] |
|---|---|---|---|---|---|---|
| | BU | MAA | S | AN | Base | |
| 6 | 99 | 1 | 68 | 30 | 2 VI | 33 |

No. 1: Comparative experiment in accordance with the prior art
Bu = Butadiene
MAA = Methacrylic acid
S = Styrene
AN = Acrylonitrile
DMAEA = Dimethylaminoethyl acrylate
VI = Vinylimidazole
¹Composition of the monomer mixture used to prepare the graft base A
²Composition of the monomer mixture used to prepare the graft shell b
³The bulk temperature during injection molding was a uniform 250° C.

We claim:

1. A particulate graft polymer comprising
   A: from 30 to 80% by weight of one or more elastomeric polymers A having a mean particle size of from 30 to 1000 nm, comprising, based on A,
   A1: from 85 to 99.8% by weight of one or more alkyl acrylates A1 having from 1 to 8 carbon atoms in the alkyl radical,
   A2: from 0.1 to 5% by weight of one or more polyfunctional, crosslinking monomers A2, and
   A3: from 0.1 to 10% by weight of one or more monomers A3 containing one or more α,β-olefinically unsaturated acid groups, or
   A11: from 80 to 99.8-0% by weight of a diene A11,
   A12: from 0 to 20% by weight of one or more vinylaromatic monomers A12,
   A13: from 0.2 to 10% by weight of one or more monomers A13 containing one or more α,β-olefinically unsaturated acid groups, as the graft base, and
   B: from 20 to 70% by weight of a shell B grafted onto the elastomeric polymer A and comprising, based on B,
   B1: from 50 to 89.9% by weight of one or more vinylaromatic monomers B1, B2: from 10 to 49.9% by weight of one or more polar, copolymerizable, ethylenically unsaturated monomers B2, and B3: from 0.1 to 10% by weight of one or more monomers B3 containing one or more basic groups, wherein said basic group is an aminoalkyl acrylate or methacrylate containing one or more amino groups in the alkyl radical or a copolymerizable, ethylenically unsaturated compound having a nitrogen-containing heterocyclic substituent.

2. A graft polymer as claimed in claim 1, containing, as monomer A3, an $\alpha,\beta$-olefinically unsaturated carboxylic acid.

3. A graft polymer as claimed in claim 1, containing, as vinyl-aromatic monomer and/or B1, styrene and/or $\alpha$-methylstyrene.

4. A graft polymer as claimed in claim 1, containing, as monomer B2, acrylonitrile and/or methyl methacrylate.

5. A graft polymer as claimed in claim 1, containing, as monomer B3, an aminoalkyl acrylate or methacrylate containing one or more amino groups in the alkyl radical or a copolymerizable, ethylenically unsaturated compound having a nitrogen-containing heterocyclic substituent.

6. A thermoplastic molding material comprising from 1 to 50% by weight of a particulate graft polymer as claimed in claim 1 and from 50 to 99% by weight of one or more polymers having a glass transition temperature of greater than 25° C. as the matrix and, if desired, secondary amounts of conventional additives and assistants.

7. A thermoplastic molding material as claimed in claim 6, containing, as the matrix, a copolymer comprising a vinyl-aromatic monomer and a polar, copolymerizable, ethylenically unsaturated monomer.

8. The thermoplastic molding material of claim 6, wherein the matrix is at least one member selected from the group consisting of polyvinyl chloride, polymethyl methacrylate, and copolymers of a vinyl-aromatic monomer and a polar, copolymerizable, ethylenically unsaturated monomer.

* * * * *